(12) United States Patent
Lucau et al.

(10) Patent No.: US 9,071,548 B2
(45) Date of Patent: Jun. 30, 2015

(54) METHODS, SYSTEMS, AND COMPUTER READABLE MEDIA FOR EFFECTING MOVEMENT OF VIRTUAL SWITCH INTERFACES BETWEEN VIRTUAL SWITCHES CONNECTED TO DIFFERENT PHYSICAL PORTS OF A DEVICE UNDER TEST

(71) Applicant: Ixia, Calabasas, CA (US)

(72) Inventors: Andreea Diana Lucau, Bucharest (RO); Dan-Alexandru Croitoru, Bucharest (RO)

(73) Assignee: Ixia, Calabasas, CA (US)

(*) Notice: Subject to any disclaimer, the term of this patent is extended or adjusted under 35 U.S.C. 154(b) by 195 days.

(21) Appl. No.: 13/731,145

(22) Filed: Dec. 31, 2012

(65) Prior Publication Data
US 2014/0177454 A1    Jun. 26, 2014

(30) Foreign Application Priority Data
Dec. 21, 2012 (RO) .................................. A12-01060

(51) Int. Cl.
*H04L 12/26* (2006.01)
*H04L 12/931* (2013.01)

(52) U.S. Cl.
CPC .............. *H04L 43/50* (2013.01); *H04L 49/70* (2013.01)

(58) Field of Classification Search
CPC ....................................................... H04L 43/14

USPC .......................................................... 370/250
See application file for complete search history.

(56) References Cited

U.S. PATENT DOCUMENTS

| | | | |
|---|---|---|---|
| 6,085,238 A * | 7/2000 | Yuasa et al. ................. 709/223 |
| 2005/0186933 A1* | 8/2005 | Trans .......................... 455/296 |
| 2006/0133405 A1* | 6/2006 | Fee ............................. 370/437 |
| 2009/0135729 A1* | 5/2009 | Saffre ......................... 370/252 |

OTHER PUBLICATIONS

"Edge Virtual Bridge Proposal," Version 0, Rev 0.1, pp. 1-72 (Apr. 23, 2010).

* cited by examiner

*Primary Examiner* — Wei Zhao
(74) *Attorney, Agent, or Firm* — Jenkins, Wilson, Taylor & Hunt, P.A.

(57) ABSTRACT

Methods, systems, and computer readable media for effecting movement of virtual switch interfaces between virtual switches connected to different physical ports of a device under test are disclosed. One method includes operating a virtual switch interface behind a first edge relay on a protocol emulator to send packets to a first physical port of a device under test. The method further includes determining whether sufficient resources exist on a second physical port of the device under test to support the virtual switch interface. The method further includes, in response to determining that sufficient resources exist on the second physical port of the device under test to support the virtual switch interface, moving the virtual switch interface to a second edge relay on the protocol emulator connected to the second physical port of the device under test.

15 Claims, 3 Drawing Sheets

METHODS, SYSTEMS, AND COMPUTER READABLE MEDIA FOR EFFECTING MOVEMENT OF VIRTUAL SWITCH INTERFACES BETWEEN VIRTUAL SWITCHES CONNECTED TO DIFFERENT PHYSICAL PORTS OF A DEVICE UNDER TEST

PRIORITY CLAIM

This application claims the benefit of Romanian Patent Application No. A2012-01060, filed Dec. 21, 2012; the disclosure of which is incorporated herein by reference in its entirety.

TECHNICAL FIELD

The subject matter described herein relates to testing network devices. More particularly, the subject matter described herein relates to methods, systems, and computer readable media for effecting movement of virtual switch interfaces between virtual switches connected to different physical ports of a device under test.

BACKGROUND

Virtual machines are software implementations of physical machines. Virtual machines are often used so that the resources of a single physical computer can be shared among many virtual computers. Each virtual machine may include virtual hardware resources, such as virtual disks, virtual processing resources, and virtual network interface cards. When multiple virtual machines share the same physical Ethernet port, this is referred to as virtual Ethernet port aggregation or VEPA. VEPA is part of the Edge Virtual Bridging Proposal, Version 0, Rev. 0.1, IEEE (Apr. 23, 2010) (hereinafter, "EVB Standard"), the disclosure of which is incorporated herein by reference in its entirety. According to the EVB Standard, an edge relay (ER) is virtual layer 2 switch used by multiple virtual machines to share the same physical Ethernet port. An edge relay can operate in VEPA mode or virtual Ethernet bridging (VEB) mode. Each virtual machine includes a virtual switch interface (VSI) that connects the virtual machine to an ER. If a VM connected to an ER operating in VEPA mode desires to send packets to another VM connected to the same ER, the EVB Standard requires that the packet be sent out of the physical Ethernet port, to an adjacent bridge, and back to the VM via the ER. The adjacent bridge is required to build VEPA forwarding tables so that packets will be transmitted correctly between VMs. If the ER is operating in VEB mode, packets can be sent between VSIs connected to the same ER without requiring that the packets be sent to the adjacent bridge.

It is desirable to test the functionality of Ethernet bridges that implement VEPA. Ethernet bridges that implement VEPA can be tested using network emulators that emulate VEPA end stations. One aspect of testing Ethernet bridges implementing VEPA may include testing the functionality of the Ethernet bridge when a virtual switch interface is moved from a virtual switch connected to one physical port of the bridge to a virtual switch connected to another physical port of the bridge. In a live network, such a move may occur when an operator desires to move a virtual machine to new hardware with faster processing capabilities. However, current network emulators do not have the capability of effecting movement of virtual switch interfaces between virtual switches connected to different physical ports of a device under test. Moreover, if a move is performed manually on the network emulator and the move fails because the destination port on the device under test lacks sufficient resources to support the virtual switch interface, the time and labor used to effect the move will be wasted.

Accordingly, there exists a need for methods, systems, and computer readable media for effecting movement of virtual switch interfaces between virtual switches connected to different physical ports of a device under test.

SUMMARY

Methods, systems, and computer readable media for effecting movement of virtual switch interfaces between virtual switches connected to different physical ports of a device under test are disclosed. One method includes operating a virtual switch interface behind an edge relay on a network emulator to send packets to a first physical port of a device under test. The method further includes determining whether sufficient resources exist on a second physical port of the device under test to support the virtual switch interface. The method further includes, in response to determining that sufficient resources exist on the second physical port of the device under test to support the virtual switch interface, moving the virtual switch interface to a second edge relay on the network emulator connected to the second physical port of the device under test.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon executable instructions that when executed by the processor of a computer control the processor to perform steps. Exemplary non-transitory computer readable media suitable for implementing the subject matter described herein include chip memory devices or disk memory devices accessible by a processor, programmable logic devices, and application specific integrated circuits. In addition, a computer readable medium that implements the subject matter described herein may be located on a single computing platform or may be distributed across plural computing platforms.

BRIEF DESCRIPTION OF THE DRAWINGS

The subject matter described herein will now be explained with reference to the accompanying drawings of which:

FIGS. 3A and 3B are computer screen shots illustrating an exemplary graphical user interface for effecting movement of virtual switch interfaces between virtual switches connected to different physical ports of a device under test according to an embodiment of the subject matter described herein.

DETAILED DESCRIPTION

Figure 1:
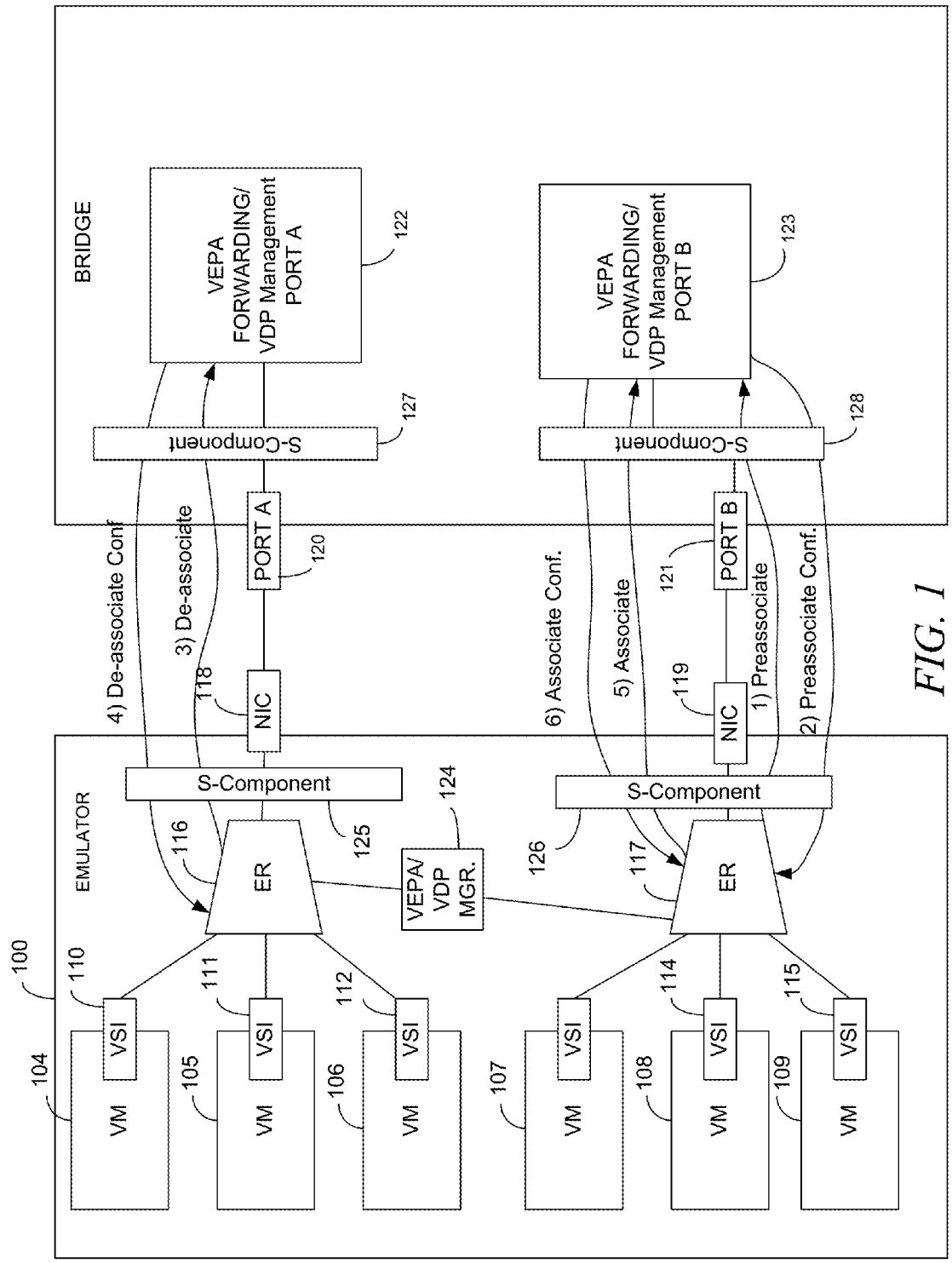
FIG. 1 is a network diagram illustrating an exemplary system for effecting movement of virtual switch interfaces between virtual switches connected to different physical ports of a device under test according to an embodiment of the subject matter described herein.

Methods, systems, and computer readable media for effecting movement of virtual switch interfaces between virtual switches on different physical ports of a device under test are disclosed. FIG. 1 illustrates an example of a system for effecting movement of virtual switch interfaces between virtual switches connected to different physical ports of a device under test according to an embodiment of the subject matter described herein. Referring to FIG. 1, the system includes a network emulator 100 configured to test a device under test 102. Network emulator 100 may emulate one or more VEPA end stations. To this end, network emulator 100 includes a plurality of virtual machines 104-109, each of which is connected to a virtual switch interface 110-115. Each virtual switch interface 110-115 is connected to ER 116 or 117, which aggregates the virtual switch interfaces and connects the virtual switch interfaces to a network interface card 118 or 119. Network interfaces 118 or 119 are connected to corresponding physical ports 120 and 121 of device under test 102. Device under test 102 may be an Ethernet bridge that implements the bridge side of the VEPA protocol. Device under test 102 includes VEPA forwarding/VSI discovery and configuration protocol (VDP) management components 122 and 123 connected to each physical port. The function of components 122 and 123 is to build VEPA forwarding tables for each physical port using the VDP protocol. VDP is the protocol by which VSIs are discovered. Network emulator 100 also includes a VEPA/VDP manager 124 for implementing the end station side of VDP protocol.

Also illustrated in FIG. 1 are S-components 125, 126, 127, and 128. S-components are multiplexers and de-multiplexers that support VLAN multiplexing and de-multiplexing. S-components 125-128 are implemented on a per port basis. Each S-component maintains VLAN tags for the VLANS that it implements. For outbound packets, an S-component inserts that appropriate VLAN tag in the packet. For incoming packets, the S-component removes the incoming VLAN tag and distributes the packet to the appropriate VSIs.

As stated above, when a virtual machine connected to an ER operating in VEPA mode desires to send packets to a virtual machine connected to the same ER, the packets are sent to the adjacent bridge, and the bridge forwards the packets back through the ER to the destination virtual machine. In FIG. 1, if virtual machine 104 desires to send packets to virtual machine 105, the packets go through VSI 110, ER 116, S-component 125, network interface 118, and to device under test 102. If the VEPA forwarding tables of device under test 102 are configured correctly, the packet will be returned through S-component 127, physical port 120, network interface 118, S-Component 125, ER 116, and VSI 111 to destination virtual machine 105.

As stated above, it may be desirable to move virtual machines and/or their associated VSIs among virtual switches connected to different physical ports of a device under test to simulate real world operations. Examples of such real world operations may be the addition of new server capabilities in a network, the migration to new hardware or software, or any other situation in which is desirable to move virtual resources among physical device ports. According to an aspect of the subject matter described herein, an edge relay connected to a proposed destination port determines whether sufficient resources exist on the proposed destination port to support the virtual switch interface prior to moving the virtual switch interface to the proposed destination port. If the destination port lacks sufficient resources to support the virtual switch interface that is proposed to be moved, the move operation fails and the virtual switch interface remains on its source port until a retry operation is effected.

Figure 2:
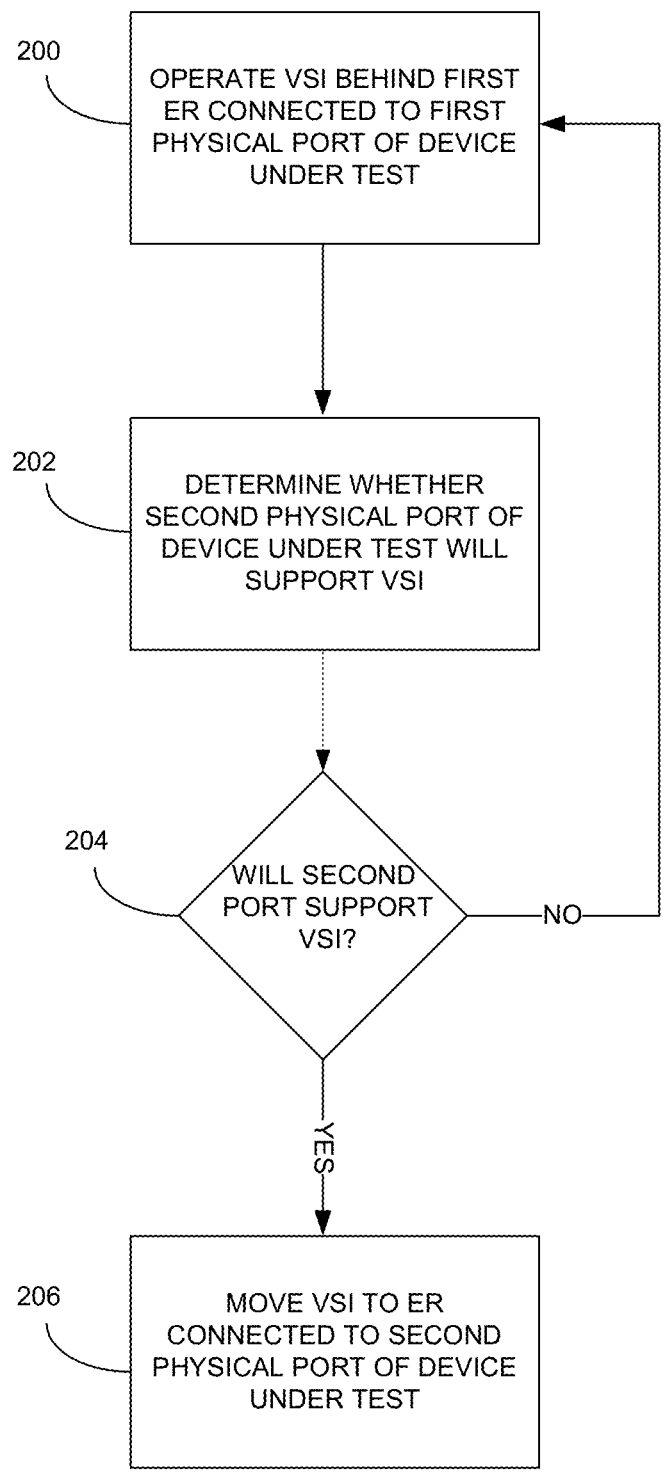
FIG. 2 is flow chart illustrating exemplary steps for effecting movement of virtual switch interfaces between virtual switches connected to different physical ports of a device under test according to an embodiment of the subject matter described herein.

FIG. 2 is a flow chart illustrating exemplary steps for effective movement of virtual machines between virtual switches connected to different physical ports of a device under test according to an embodiment of the subject matter described herein. Referring to FIG. 2, in step 200, a virtual switch interface is operated behind a first edge relay on a network emulator to send packets to a first physical port of a device under test. Referring to FIG. 1, VSI 110 may operate behind ER 116 to send packets to port A 120 of device under test 102.

Returning to FIG. 2, in steps 202 and 204, it is determined whether sufficient resources exist on a second physical port of the device under test to support the virtual switch interface. For example, VEPA/VDP manager 124 may instruct ER 117 to determine whether port B 121 of device under test 102 has sufficient resources to support movement of VSI 110 to port B 121. This determination may be made by sending a pre-associate message from ER 117 to VEPA forwarding/VDP management component 123 for port B. The device under test will check available resources at the destination port and determine whether the destination port will support the VSI. Examples of resources that may be checked include whether sufficient space exists in a VEPA forwarding table associated with the proposed destination port to hold an entry for the VSI and whether available processing capacity exists on the destination port to forward packets associated with the VSI. The pre-associate message may be sent with or without resource reservation, depending on whether it is desirable to reserve the resources for the VSI in advance of the move or not.

Returning to FIG. 2, in step 206, in response to determining that sufficient resources exist on the second physical port of the device under test to support the virtual switch interface, the virtual switch interface is moved to a second edge relay on the network emulator connected to the second physical port of the device under test. In FIG. 1, VSI 110 may be moved to ER 117 by first sending a de-associate message from ER 116 to VEPA forwarding/VDP management component 122 for port A and receiving the corresponding de-associate confirmation message. The de-associate message instructs VEPA forwarding/VDP management component 122 associated with port A 120 of the device under test to free resources associated with VSI 110. ER 117 then sends an associate message to VEPA forwarding/VDP management component 123 for port B and receives a corresponding associate confirmation message. The associate message copies packet forwarding information, such as Ethernet address and VLAN tag associated with VSI 110, to port B 121 of device under test 102.

Returning to step 204 in FIG. 2, if it is determined that sufficient resources do not exist on port B of the device under test to support the move, the VSI is not moved to the destination port and control returns to step 200 where the virtual switch interface remains on the original port of the device under test and continues to operate on that port. Movement may be retried a configurable number of times before a failure is indicated to the operator.

Accordingly, by checking whether sufficient resources exist prior to moving a virtual switch interface between virtual switches connected to different physical ports of a device under test, a move may only be effected if the move will be successful. Moving only if the proposed move will be successful provides a more elegant solution than attempting the move, determining after the attempt that the destination port lacks sufficient resources to support the move, and then failing the move.

Figures 3A, 3B:
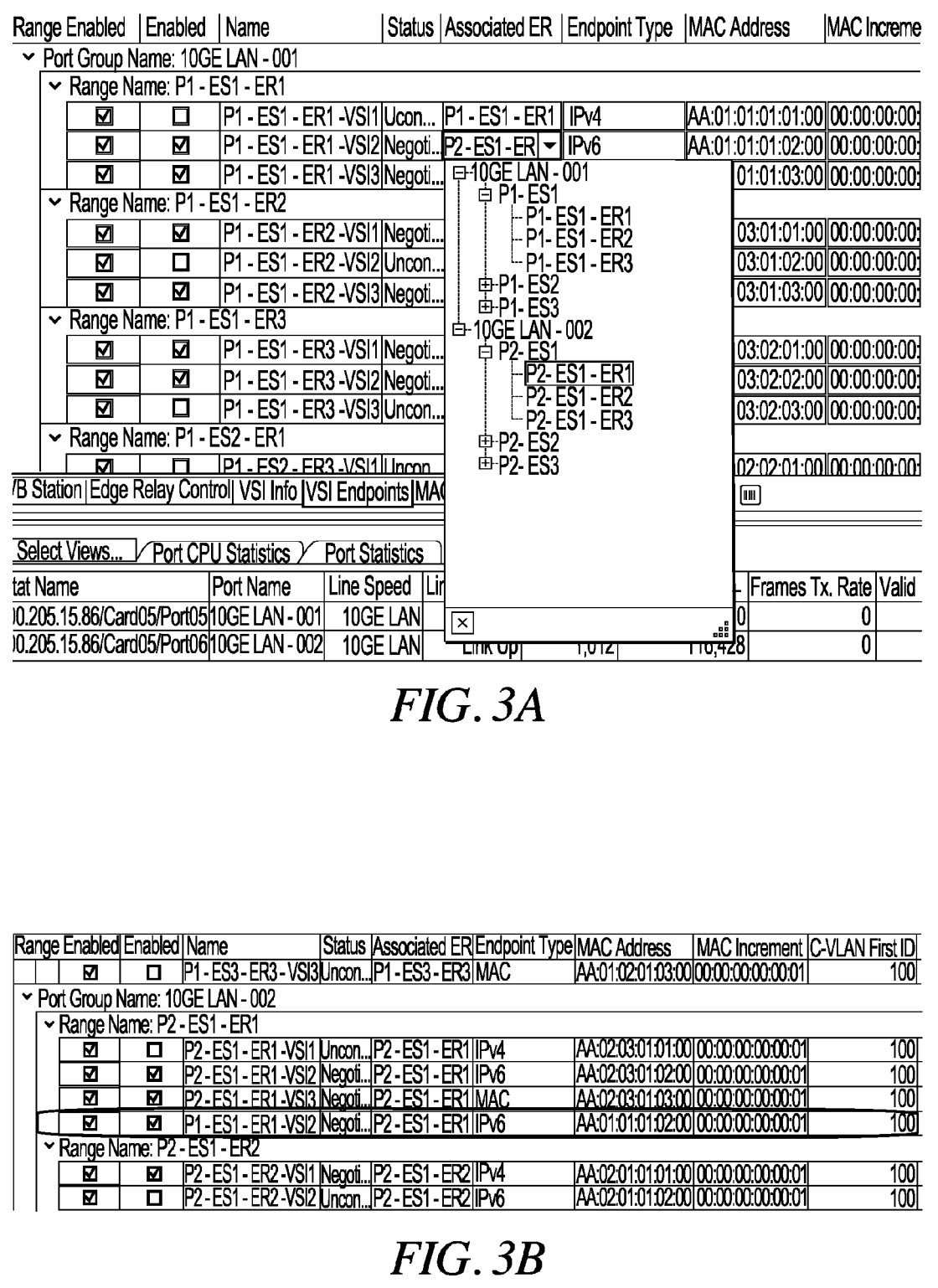

FIGS. 3A and 3B illustrate examples of a graphical user interface for moving a VSI between virtual switches connected to different physical ports of a device under test. FIG. 3A illustrates an exemplary graphical user interface before moving a VSI between virtual switches connected to different physical ports of a device under test, and FIG. 3B illustrates the graphical user interface after the move. Referring to FIG. 3A, each row in the graphical user interface corresponds to a VSI. Each group of three rows corresponds to a group of VSIs behind the same edge relay. For example, the first three rows indicate that VSIs 1-3 are behind edge relay 1. Each VSI includes an "Associated ER" column, which indicates the physical port on the device under test with which the VSI is associated. In the illustrated example, VSI 2 on edge relay 1 of the network emulator is associated with port 1 of the device under test.

To effect movement of VSI 2 on the network emulator to an edge relay connected to port 2 of the device under test, the user selects the Associated ER column and selects a new port of the device under test. In the illustrated example, the user selects edge relay 1 connected to port 2 of the device under test. When the user selects edge relay 1 on port 2, the pre-associate procedure illustrated in FIG. 1 is conducted. If the pre-associate procedure is successful, VSI 2 is moved to edge relay 1 connected to port 2 of the device under test. FIG. 3B illustrates the results of moving VSI 2 to edge relay 1 connected to port 2 of the device under test. In FIG. 2, it can be seen that VSI 2 is now associated with edge relay 1 on port 2 of the device under test.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for effecting movement of virtual switch interfaces between virtual switches connected to different physical ports of a device under test, the method comprising:
    operating a virtual switch interface behind a first edge relay on a network emulator to send packets to a first physical port of the device under test, wherein the network emulator emulates at least one virtual Ethernet port aggregation (VEPA) end station;
    determining whether sufficient resources exist on a second physical port of the device under test to support the virtual switch interface; and
    in response to determining that sufficient resources exist on the second physical port of the device under test to support the virtual switch interface, moving the virtual switch interface to a second edge relay on the network emulator connected to the second physical port of the device under test.

2. The method of claim 1 wherein determining whether sufficient resources exist on the second physical port of the device under test to support the virtual switch interface comprises sending, from the second edge relay, a first message to the second physical port of the device under test.

3. The method of claim 2 wherein the first message comprises a pre-associate message.

4. The method of claim 3 wherein determining whether sufficient resources exist on the second physical port of the device under test to support the virtual switch interface includes determining whether a response to the pre-associate message is received indicating that sufficient resources exist on the second physical port of the device under test to support the virtual switch interface.

5. The method of claim 2 comprising, in response to receiving a second message from the second physical port of the device under test indicating that the second physical port of the device under test does not have sufficient resources to support the virtual switch interface, refraining from moving the virtual switch interface to the second edge relay connected to the second physical port of the device under test.

6. The method of claim 1 comprising providing a graphical user interface for allowing a user to automatically initiate the determining and the moving.

7. The method of claim 1 wherein moving the virtual switch interface comprises copying packet forwarding information associated with the virtual switch interface to the second edge relay and to the second physical port of the device under test and freeing resources associated with the virtual switch interface at the first edge relay and at the first physical port of the device under test.

8. A system for effecting movement of virtual switch interfaces connected to different physical ports of a device under test, the system comprising:
    a network emulator that emulates at least one virtual Ethernet port aggregation (VEPA) end station, the network emulator comprising:
        a first edge relay for connecting to a first physical port of the device under test;
        a virtual switch interface for operating behind the first edge relay on the network emulator to send packets to the first physical port of a device under test; and
        a second edge relay for connecting to a second physical port of a device under test, for determining whether sufficient resources exist on a second physical port of the device under test to support the virtual switch interface; and,
    in response to determining that sufficient resources exist on the second physical port of the device under test to support the virtual switch interface, moving the virtual switch interface to the second edge relay connected to the second physical port of the device under test.

9. The system of claim 8 wherein determining whether sufficient resources exist on the second physical port of the device under test to support the virtual switch interface comprises sending, from the second edge relay, a first message to the second physical port of the device under test.

10. The system of claim 9 wherein the first message comprises a pre-associate message.

11. The system of claim 10 wherein determining whether sufficient resources exist on the second physical port of the device under test to support the virtual switch interface includes determining whether a response to the pre-associate message is received indicating that sufficient resources exist on the second physical port of the device under test to support the virtual switch interface.

12. The system of claim 9 comprising, in response to receiving a second message from the second physical port of the device under test indicating that the second physical port of the device under test does not have sufficient resources to support the virtual switch interface, refraining from moving the virtual switch interface to the second edge relay connected to the second physical port of the device under test.

13. The system of claim 8 comprising a graphical user interface for allowing a user to automatically initiate the determining and the moving.

14. The system of claim 8 wherein moving the virtual switch interface comprises copying packet forwarding information associated with the virtual switch interface to the second edge relay and to the second physical port of the device under test and freeing resources associated with the virtual switch interface at the first edge relay and at the first physical port of the device under test.

15. A non-transitory computer readable medium having stored thereon executable instructions that when executed by the processor of a computer control the computer to perform steps comprising:
- operating a virtual switch interface behind a first edge relay on a network emulator to send packets to a first physical port of a device under test, wherein the network emulator emulates at least one virtual Ethernet port aggregation (VEPA) end station;
- determining whether sufficient resources exist on a second physical port of the device under test to support the virtual switch interface; and
- in response to determining that sufficient resources exist on the second physical port of the device under test to support the virtual switch interface, moving the virtual switch interface to a second edge relay on the protocol emulator connected to the second physical port of the device under test.

\* \* \* \* \*